(12) United States Patent
Denne et al.

(10) Patent No.: US 6,734,358 B2
(45) Date of Patent: May 11, 2004

(54) HOLDER FOR ELECTRO-PNEUMATIC COMPONENTS

(75) Inventors: Albert Denne, Meerbusch (DE); Rolf Dohrmann, Kaarst (DE); Janust Zurke, Wappertal (DE)

(73) Assignee: Pierburg, GmbH, Neuss (DE)

( * ) Notice: Subject to any disclaimer, the term of this patent is extended or adjusted under 35 U.S.C. 154(b) by 0 days.

(21) Appl. No.: 10/302,117

(22) Filed: Nov. 22, 2002

(65) Prior Publication Data

US 2003/0102144 A1 Jun. 5, 2003

(30) Foreign Application Priority Data

Dec. 1, 2001 (DE) .......................................... 101 59 065

(51) Int. Cl.$^7$ ................................................. H01B 3/00
(52) U.S. Cl. ..................... 174/68.1; 174/68.3; 174/101; 439/210; 52/220.5
(58) Field of Search ............................. 174/68.1, 68.3, 174/101, 70 R, 93; 52/220.5, 220.3; 439/210, 120

(56) References Cited

U.S. PATENT DOCUMENTS

| | | | | |
|---|---|---|---|---|
| 5,663,527 A | * | 9/1997 | Hui ........................... | 174/68.3 |
| 6,504,098 B2 | * | 1/2003 | Seamans ..................... | 174/68.3 |
| 6,528,726 B1 | * | 3/2003 | Jauch et al. ................ | 174/68.3 |

FOREIGN PATENT DOCUMENTS

| | | |
|---|---|---|
| DE | 4110003 | 7/1992 |
| DE | 4419875 | 12/1995 |
| EP | 0 105 808 | 4/1984 |

\* cited by examiner

*Primary Examiner*—Dhirubhai R Patel
(74) *Attorney, Agent, or Firm*—Ohlandt, Greeley, Ruggiero & Perle

(57) ABSTRACT

A holder for electro-pneumatic components for vehicles provides for a base plate with fastening elements for fastening the holder in the vehicle. Holding elements for releasable holding the electro-pneumatic components are connected to the base plate. The fixing elements each have two holding arms designed as click-in elements. Further, a fixing element in the form of a small elastic plate, such as a rubber disc, is provided. The fixing element presses the electro-pneumatic component against an abutment for a vibration-resistant fixation.

19 Claims, 4 Drawing Sheets

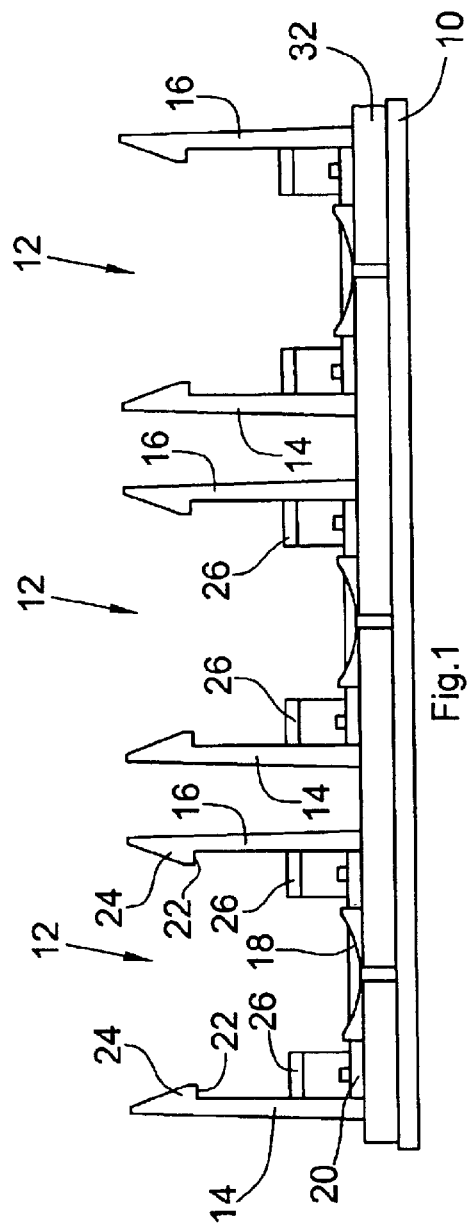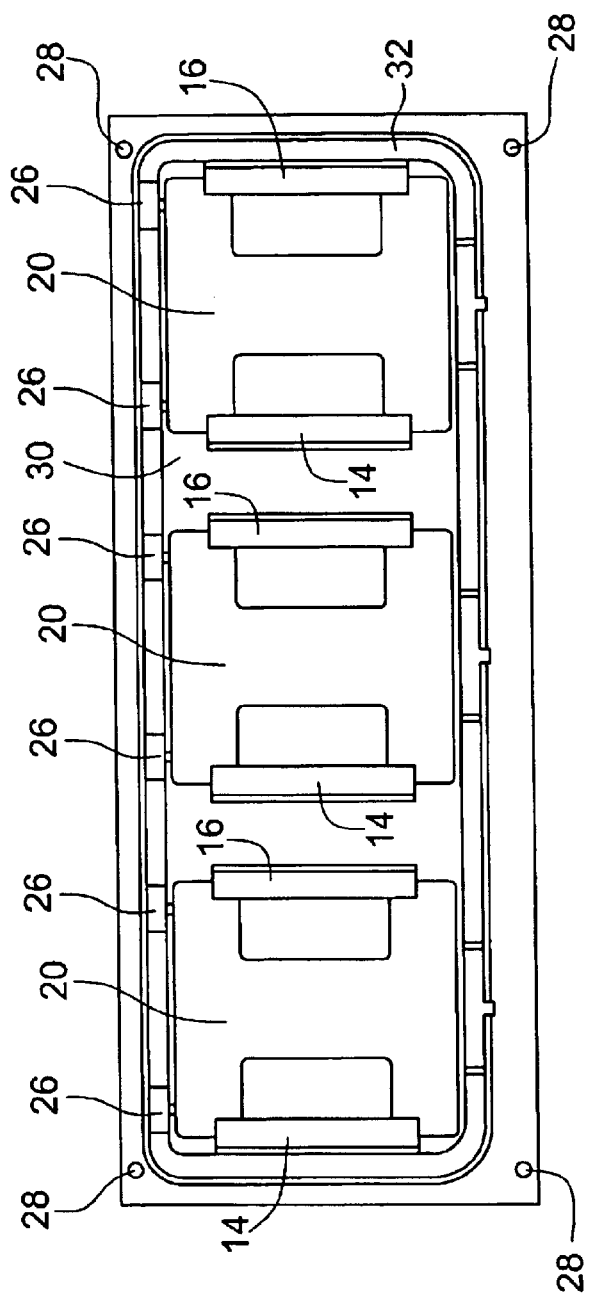

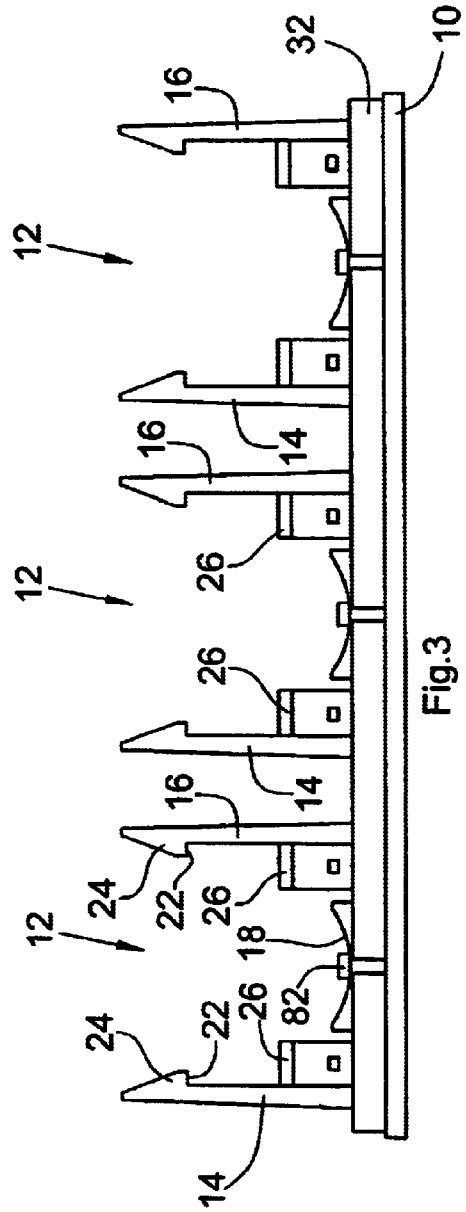
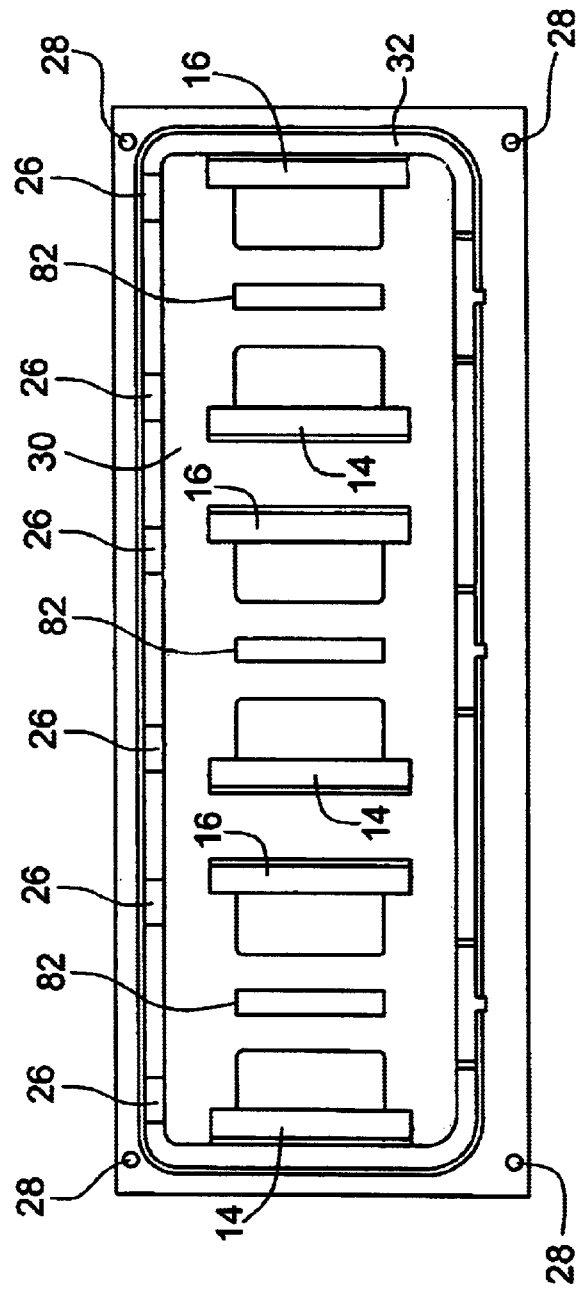
Fig. 3
Fig. 4

HOLDER FOR ELECTRO-PNEUMATIC COMPONENTS

FIELD OF THE INVENTION

The present invention relates to a holder for electro-pneumatic components for automotive vehicles. Electro-pneumatic components are, for example, electro-pneumatic pressure transformers or electromagnetic reversing valves.

DISCUSSION OF THE BACKGROUND ART

Electro-pneumatic pressure transformers are described in EP 0 105 808 and DE 41 10 003, for example. Such pressure transformers may have three pneumatic ports, one port being connected to a vacuum generator, another port being connected to ambient or atmospheric pressure, and the third port being connected to a load such as an exhaust gas recycling valve. Using a double seat valve, a pressure in the range between the ambient pressure and the vacuum can be set at the port connectable with the load. Depending on the position of the valve, the pressure supplied to the load can be set within this range. For actuation, the valve is connected to a solenoid plunger system so that, by applying electric signals, the valve can be switched or the position of the valve piston can be varied.

An electromagnetic reversing valve is described in DE 44 19 875, for example. Such valves typically comprise three pneumatic or fluidic ports, where two inlet channels are merged into one outlet channel and the outlet channel may selectively be connected with one of both channels. To switch the valve, an armature is provided that is surrounded by a magnetic coil. The armature which may be displaced by switching the magnetic coil serves to close one of the two inlet channels, respectively. Similarly, the armature could be located in an intermediate position so that a predetermined mixing ratio of the two fluids flowing through the supply channels.

The above-described electro-pneumatic components that have at least one and usually several pneumatic or fluidic ports are employed in automotive vehicles to control loads such as exhaust gas recycling valves or reversing valves. Since these electro-pneumatic components are sensitive to vibrations, they are individually mounted in the vehicles with screws and are fastened, for example, with vibration dampers at the body or another part of the vehicle. After the components have been mounted in the vehicle with vibration damping, these are wired individually and connected to corresponding hoses. The mounting of such electro-pneumatic components is thus extremely troublesome and costly.

It is the object of the present invention to simplify the mounting of electro-pneumatic components.

SUMMARY OF THE INVENTION

The invention provides a common holder for a plurality of electro-pneumatic components for automotive vehicles. The holder comprises a base plate with fastening elements for fastening the holder to the vehicle. By these fastening elements, the base plate can be mounted in the vehicle, for example due to interposed vibration dampers. Thus, only the base plate has to be fastened, not each individual electro-pneumatic component. This already allows to save time and costs during assembly.

According to the invention, the base plate comprises holding elements for releasably retaining the electro-pneumatic components. The holding elements may be spring brackets, catches, and the like, for example. Preferably, the holding elements are designed such that the electro-pneumatic components may be connected with the base plate in a simple manner, for example by being pressed into a catch or the like. This is particularly advantageous in that connecting the electro-pneumatic components with the base plate may be effected as a pre-assembly step and that the pre-assembled base plate can then be mounted in the vehicle, e.g., at the assembly line. Thus, a further reduction of the costs is possible. Further, the components are easy to replace.

Since electro-pneumatic components are sensitive to vibrations and impacts, the present holder comprises a fixing element. The fixing element presses the individual electro-pneumatic components against an abutment, whereby they are fixed in the holder in a manner resistant to vibrations. In particular, the provision of the fixing element allows to compensate for manufacturing tolerances. Thus, the preferably elastic fixing element ensures that the electro-pneumatic components are fixed in the holder in a manner resistant to vibrations. Preferably, the fixing element is constructed such that even at the worst possible addition of tolerances no rattling or vibrating of the electro-pneumatic components in the holder can occur. This is achievable in particular with an elastic fixing element that is compressed when mounting the electro-pneumatic components and presses the component against an abutment.

Preferably, the holding elements are designed as catch elements, each holding element comprising a pair of elastic holding arms. The two preferably opposite holding arms are elastically connected to the base plate of the holder. Preferably, the holding arms comprise lugs that partly embrace the electro-pneumatic component. Thus, the component may be mounted by simply pressing it in between the two holding arms.

According to a particularly preferred design of the lugs they simultaneously serve as abutments for the fixing element. Thus, the lugs serve the double function of locking or click-in noses, on the one hand, and of abutments, on the other hand. In this embodiment, the fixing element is a small elastic plate, such as a rubber disc, for example, arranged on the base plate opposite the abutments. However, it is also possible to construct the fixing element as a resilient rib connected with the base plate, preferably by injection. Such an elastically resilient rib also presses the electro-pneumatic components against the abutment.

A particularly preferred embodiment of the present holder comprises a lid to be connected to the base plate so that the electro-pneumatic components are arranged within a housing formed by the base plate and the lid. Preferably, a sealing element is provided between the lid and the base plate. To form the housing, the base plate is either integrally connected with side walls so that a sort of box is obtained on which the lid may be placed and connected therewith by means of a snap connection or the like, or the side walls are fixedly connected to the lid so that the lid is set on a substantially planar base plate.

It is particularly preferred, to design the lid and/or the base plate such that contact elements are provided in the lid and/or the base plate which may be connected with electric terminals of the individual electro-pneumatic components. Here, the contact elements are connected with electric lines encapsulated in the lid or the base plate, for example. Specifically, the contact elements are arranged such that upon insertion of the electro-pneumatic components into the holding elements or upon closing the holder with the lid, an electric contact is established automatically between the contact elements and the terminals of the electro-pneumatic components.

Further, it is particularly preferred that pneumatic ports of the individual electro-pneumatic components are connected by pneumatic lines or hoses. In particular with a holder holding a plurality of electro-pneumatic components where one port is connected with the same pressure generator, it is possible to combine these ports. With electro-pneumatic pressure transformers, these are usually the ports connected with a vacuum generator, such as the air intake system, and those ports that are connected to ambient or atmospheric pressure.

It is particularly preferred, to also provide these pneumatic lines in the lid or in the base plate, the ports to those pneumatic lines being arranged such that already upon mounting the individual electro-pneumatic components or upon closing the housing wit the lid, an automatic connection of the connectors and the pneumatic lines is achieved.

BRIEF DESCRIPTION OF THE DRAWINGS

The following is a detailed description of preferred embodiments of the invention with reference to the accompanying drawings.

In the drawings:

FIG. 1 illustrates a schematic front view of a first embodiment of the invention, FIG. 2 illustrates a schematic top plan view of the holder shown in FIG. 1, FIG. 3 illustrates a schematic front view of a second embodiment of the invention; and FIG. 4 illustrates a schematic top plan view of the holder shown in FIG. 3;

DETAILED DESCRIPTION OF THE INVENTION

Figure 5:
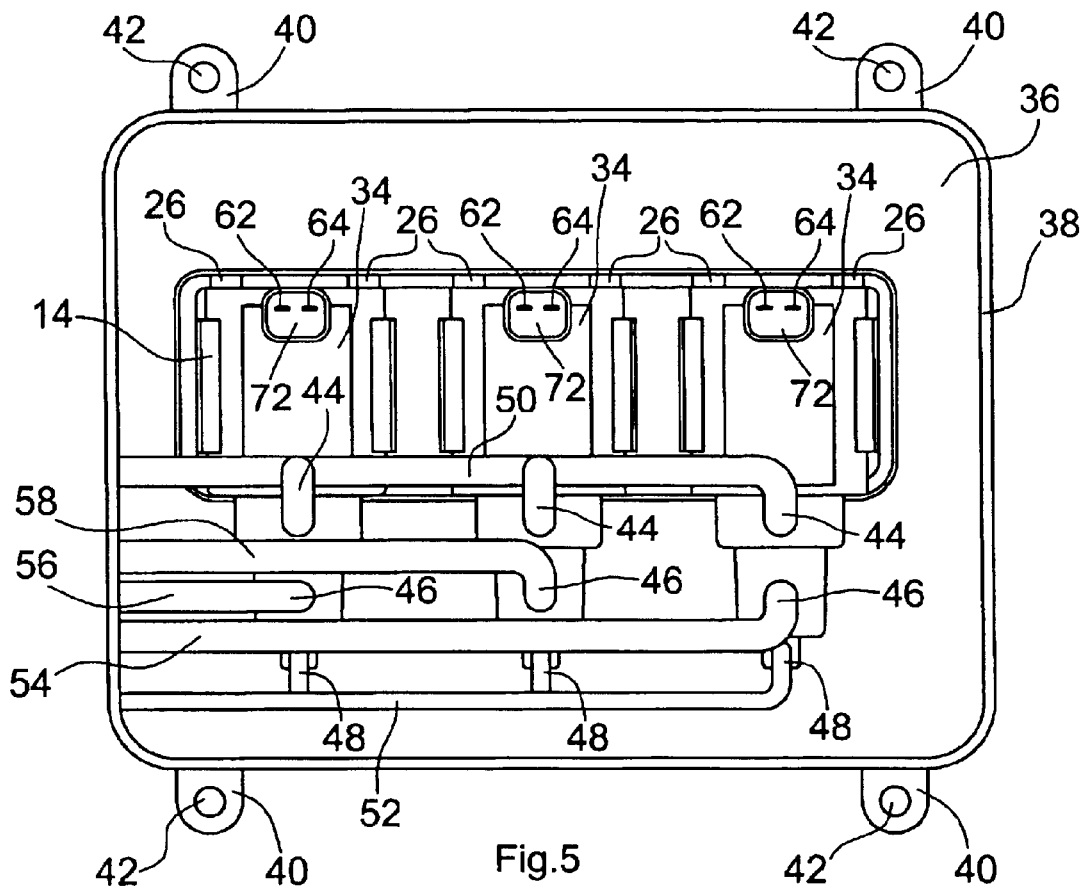
FIG. 5 illustrates a schematic top plan view of a third embodiment of the invention.

The holder for electro-pneumatic components for vehicles comprises a base plate 10. In the embodiment shown, three holding elements 12 for electro-pneumatic components are connected with the bases plate 10. The holding elements 12 each comprise one pair of holding arms formed by two holding arms 14, 16, each holding arm pair 14, 16 serving to receive an electro-pneumatic component. To this end, the electro-pneumatic component is moved from the top down in FIG. 1 so that the two holding arms 14, 16 are pushed apart and move towards each other or snap together as soon as the electro-pneumatic component is entirely introduced. The bottom surface of the electro-pneumatic component then rests on a guiding recess 18 which is concave in the embodiment illustrated, and on a small elastic plate 20 serving as a fixing element. The elastic plate 20 is thereby compressed so that the elastic plate 20 pushes the electro-pneumatic component upward in FIG. 1. A contact surface of the housing of the electro-pneumatic component is pressed against abutments 22. The abutments are formed by lugs 24 of the two holding arms 15, 16. The electro-pneumatic component is thus clamped between the elastic plate 20 and the abutments 22 of the lugs 24 and it held resistant to vibrations in this position.

In addition, each of the holding elements 12 can comprise two further locking or click-in arms 26 flexibly connected to the base plate 10 and allowing for a further fixing of the electro-pneumatic components in the holder.

The fixing element 20, which in the illustrated embodiment is an elastic plate, such as a rubber plate, preferably has a double-T shape (FIG. 2) Thus, it is possible to exert forces corresponding to the deformation on the electro-pneumatic component so that the same is fixed between the fixing element 20 and the abutments 22 in a manner resistant to vibrations. Specifically, the fixing element 20 compensates for tolerances.

Further, the base plate comprises fastening elements 28 in the form of throughbores. In these throughbores 28, damping elements may be provided so that the base plate 10 can be mounted in the vehicle by means of screws or other fastening means with the damping elements interposed. The entire holder for the electro-pneumatic components thus comprises a common vibration damping. This is advantageous in that vibration damping does not have to be provided for each individual electro-pneumatic component.

For ease of mounting, the base plate 10 comprises a recess 30. This has the advantage that the fixing elements 20 can be placed in a simple manner into the recess 30 between each respective pair of holding arms 14, 16 without shifting. In the embodiment illustrated, the recess 30 is formed by an edge 32.

The second preferred embodiment (FIGS. 3 and 4) is generally identical to the first embodiment (FIGS. 1 and 2); however, resilient rib 82 is connected with base plate 10. Such an elastically resilient rib also presses the electro-pneumatic components against the abutment. Corresponding or similar elements bear the same reference numeral.

The third preferred embodiment (FIGS. 5–7) is generally identical to the first embodiment (FIGS. 1 and 2), however, it is arranged in a housing adapted to be closed. Corresponding or similar elements bear the same reference numerals.

In particular, the holding elements 12 formed by the two holding arms 14, 16 of the second embodiment are identical to those of the first embodiment. Below the electro-pneumatic components 34 illustrated in FIG. 5, the fixing elements 20 are also provided for fixing the components in a manner resistant to vibration by pressing the components 34 in FIG. 5 out from the plane of the drawing against the abutments 22 of the holding arms 14, 15.

Different from the first embodiment (FIGS. 1 and 2), the base plate 10 is replaced with a base plate 36 connected to a circumferentially extending wall 38 so as to form the bottom part of a housing. The height of the wall is chosen such that the electro-pneumatic components 34 are arranged entirely within the housing part. For a simple mounting of the second embodiment of the holder, ears or lugs 40 are connected to the base plate 36 comprising fastening elements 42 corresponding to the fastening elements 28 and also serving to fasten the entire holding in the vehicle in a damped manner.

In FIG. 5, the electro-pneumatic components illustrated are pressure transformers 34, each electro-pneumatic pressure transformer 34 having three pneumatic ports 44, 46, 48. The pneumatic ports 44 are connected to ambient pressure. Since this is true for all three electro-pneumatic pressure transformers 34, the invention provides that the ports 44 are connected to a single common pneumatic line 50. The pneumatic line 50 extends towards the housing wall 38 and ends therein. Thus it is possible to apply a hose or line to the pneumatic line 50 from outside and to connect it with the pneumatic line 50.

The ports 48 are connected to a vacuum generator, such as the air intake system of an internal combustion engine. Since all ports 48 of the three electro-pneumatic pressure transformers 34 arranged in the holder are connected to the same vacuum generator, this may again be effected using a common pneumatic line 52. The pneumatic line 52 extends towards the housing wall 38 and terminates in the same so that it can be connected with a corresponding line or hose from the outside.

The three ports 46 of the three pressure transformers 34 are connected to different loads. Thus, it is not possible to combine these three lines. Rather, three pneumatic lines 54, 56, 58 extend towards the housing wall 38 where they terminate, so that those lines can also be connected to corresponding lines or hoses from outside.

Figure 6:
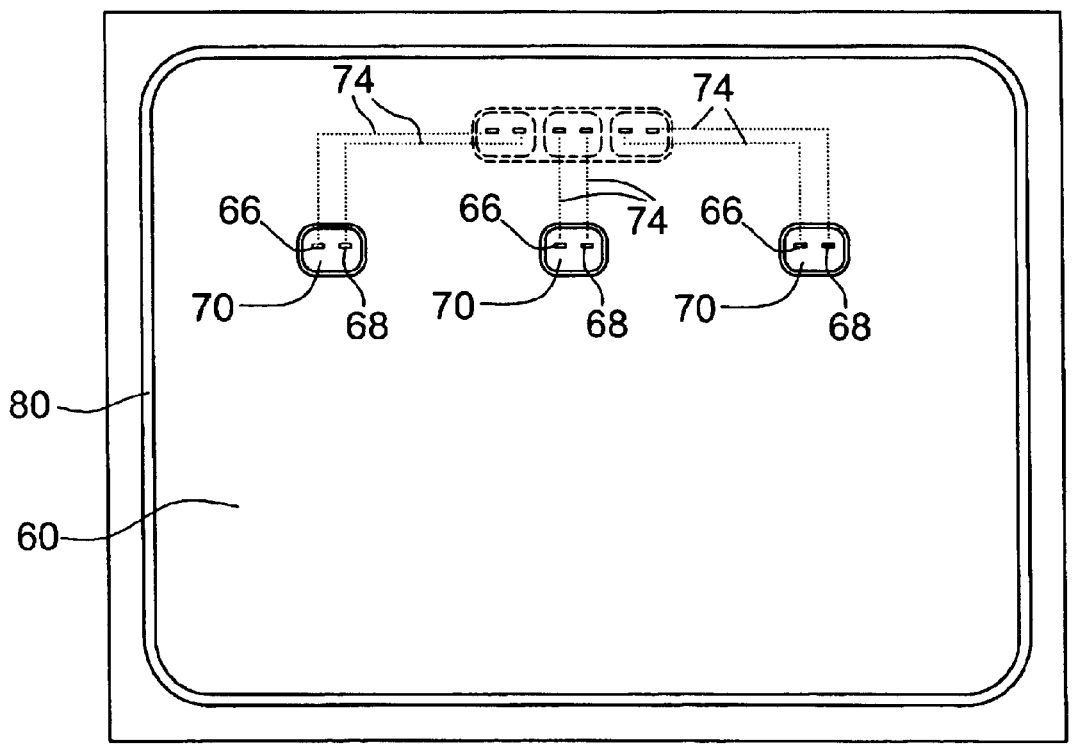
FIG. 6 illustrates a schematic bottom view of the lid for the embodiment shown in FIG. 5, and FIG. 7 Illustrates a schematic side elevational view of the lid.
Figure 7:
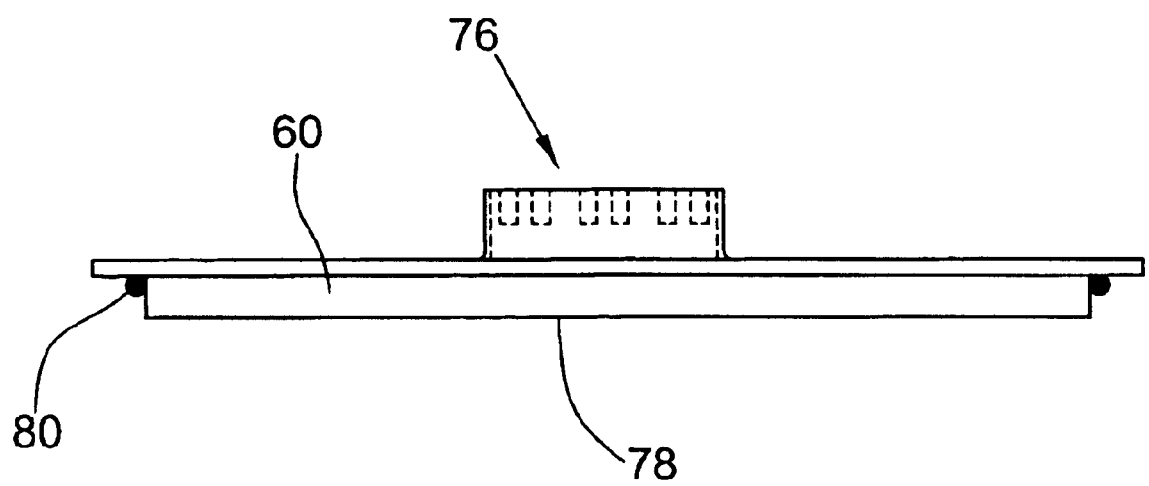

The housing half formed of the base plate 36 and the side wall 38 can be closed with a lid 60 (FIG. 6). In order to allow a complete pre-assembly of the electro-pneumatic components 34 in the housing, not only the pneumatic ports 44, 46, 48 of the three components 34, but also the electric ports 62, 64 (FIG. 5) are lead outside. To this end, the inner side of the lid is provided with contact elements 66, 68, respectively arranged in a lug 70. When placing the lid 60 on the holder, the lugs 70 are automatically introduced into corresponding recesses 72 of the components 34 so that an automatic connection of the contacts 62, 64 with the contact elements 66, 68 is effected. The contact elements 66, 68 are then lead outside to a socket element 76 via lines 74 which may be encapsulated in the lid. A single plug with six poles may be plugged into the socket element 76 so that electric contact to all electro-pneumatic components 34 is made by plugging in a single plug.

At the inner side, the lid 60 has a projection 78 (FIG. 7) having the inner dimensions of the circumferential wall 38. Thus, sufficient guiding is achieved when the lid is placed on the housing half. Further, the lug 78 is surrpunded by a ring seal 80. For example, the lid 60 can be fixedly connected to the housing wall 38 using a bracket or the like so that a tight closure of the housing is guaranteed.

What is claimed is:

1. A holder for electro-pneumatic components for vehicles, comprising:
    a base plate with fastening elements for fastening the holder in the vehicle,
    holding elements for releasably holding the electro-pneumatic components and being connected to the base plate and
    a fixing element pressing the electro-pneumatic component against an abutment of lugs for a vibration-resistant fixation.

2. The holder of claim 1, wherein said holding elements are designed as click-in elements.

3. The holder of claim 1, wherein each of said holding elements comprises a pair of elastic holding arms with said lugs at least partly embracing the respective electro-pneumatic component.

4. The holder of claim 1, wherein said fixing element is a small elastic plate adapted to be placed into the holder.

5. The holder of claim 1, further comprising at least one resilient rib formed to said base plate as said fixing element.

6. The holder of claim 1, further comprising a lid provided for connection with said base plate.

7. The holder of claim 6, further comprising a sealing element provided between said base plate and said lid.

8. The holder of claim 6, wherein said lid and said base plate comprise a housing and contact elements for electrically connecting terminals at said electro-pneumatic components to electric lines.

9. The holder of claim 8, wherein said contact elements are arranged in said base plate that upon connecting said electro-pneumatic components with said base plate, said holding elements automatically establish electric contact between said contact elements and said terminals.

10. The holder of claim 8, wherein said contact elements are arranged in said lid that upon closing the housing an electric contact is automatically established between said contact elements and said terminals.

11. The holder of claim 6, wherein said base plate and said lid is connected with a plug element for common connection to an electric connecting wire.

12. The holder of claim 6, further comprising pneumatic and electric connecting elements provided at said base plate and said lid.

13. The holder of claim 6, wherein said base plate or said lid is connected with a plug element for common connection to an electric connecting wire.

14. The holder of claim 6, further comprising pneumatic or electric elements provided at said base plate and said lid.

15. The holder of claim 6, further comprising pneumatic and electric elements provided at said base plate or said lid.

16. The holder of claim 6, further comprising pneumatic or electric elements provided at said base plate or said lid.

17. The holder of claim 1, further comprising pneumatic ports of a plurality of said electro-pneumatic components combined by respective pneumatic lines.

18. The holder of claim 17, wherein said pneumatic lines are arranged in said base plate such that upon connecting said electro-pneumatic components with said base plate by means of said holding elements an automatic connection with said pneumatic ports of said electro-pneumatic components is established.

19. The holder of claim 17, wherein said pneumatic lines are arranged in a lid such that upon closing a housing an automatic pneumatic connection between said pneumatic ports of said electro-pneumatic components and said pneumatic lines is established.

* * * * *